July 15, 1969 H. J. WILHELMY 3,456,068
TELEVISION APPARATUS
Filed Feb. 7, 1966

INVENTOR.
HANS JURGEN WILHELMY
BY
Buckman and Archer
ATTORNEYS

United States Patent Office 3,456,068
Patented July 15, 1969

3,456,068

TELEVISION APPARATUS

Hans J. Wilhelmy, 17 Geibelstrasse,
8 Munich 27, Germany

Filed Feb. 7, 1966, Ser. No. 525,494
Claims priority, application Germany, Feb. 9, 1965,
W 38,509
Int. Cl. H04n *1/46, 9/00, 7/00*
U.S. Cl. 178—5.2 19 Claims

ABSTRACT OF THE DISCLOSURE

A color television system wherein a pilot signal of known characteristics is transmitted simultaneously with the usual color program signals. The home receiver is responsive to the pilot signal to produce an electric signal having corresponding characteristics. These corresponding characteristics are then compared with the known characteristics and the receiver is adjusted until the deviation therebetween is substantially zero.

The well known American color TV system according to NTSC standards is using a subcarrier with double amplitude modulation for the transmission of the chrominance signals. However, the subcarrier frequency itself is not transmitted continuously to the receiver, but only shortly before the beginning of each line with the so-called "burst." From these bursts the receiver has to derive a continuous oscillation, which has to be identical with the oscillation of the transmitter not only in its frequency, but also in its phase, because otherwise the decoding circuit, as it is fed with this oscillation, would deliver wrong color signals to the picture tube. A completely automatic system for correcting eventual phase errors and wrong color reproduction has not been published hitherto; but also if manually operated controls are supplied to the operator of the receiver, he has no safe reference or comparative values to find the correct hue and he has to rely on the casual contents of the picture and his own personal color memory.

European developments have eliminated this drawback of the NTSC system efficiently, but to achieve this they had to modify the NTSC transmission standards considerably. Hence these later systems cannot be of universal use, and especially not in the U.S.A., where a modification of the standards is not feasible due to the very high number of participants.

The subject of this invention is an improvement of the color television system according to NTSC standards, for obtaining correct color reproduction, which does not require changes of the NTSC transmission standards, but only the addition of an auxiliary signal, which does not disturb the function of the existing receivers, thus assuring full compatability. The proposed auxiliary signal produces on an edge of the screen, which may be masked, a permanent color sample (which might be called "Pilot Color"), this latter being independent from the picture information. Side by side with this color sample is produced another color sample, called the reference color, and this latter does not depend on the phase of the received signal; the pilot color, on the other hand, strongly depends on the local phase, as this signal is coming from the transmitter and hence is exposed to phase and hue errors, just like the general picture information. Now, if the operator, while watching the screen, actuates the phase shifting element until both color samples, i.e. the pilot color and the reference color, are identical, the whole picture will be received with true colors, and this is so specially because, according to this invention, the pilot color is located at line end, where usually the phase and color errors are worse. Another part of the invention eliminates the human intervention from this control process, thus achieving automatic hue correction: a photo-electronic and a purely electronic method will be described.

Figure 1:
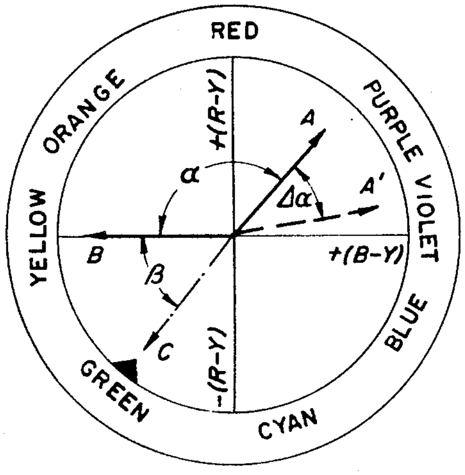

In the drawing FIG. 1 is a vectorial diagram to explain the general idea. B is the reference vector, given sequentially before the beginning of each line by the burst, and then stored dynamically by a very stable local oscillator with automatic frequency- and phase-control. A is the chrominance vector and hence depends on the modulation and on the picture information. Its angle $\alpha$ relative to vector B defines hue and may be variable between 0° and 360°. The color names written around the outer circle of said diagram are indicating approximately the colors which correspond to each position of vector A, in this drawing "purple." Now, if due to some defect of the transmission path or of the local oscillator the reference vector B is delivered with an $\Delta\alpha$ (compared to the transmitter phase), this gives the same result as a chrominance vector A' received with the same angular error because the color decoding circuit always starts from the reference vector; in this example, "violet" is received instead of "purple." To remedy this, according to this invention, an auxiliary color vector C is introduced at the transmitting end. This new vector C and the reference- (or burst-) vector B are enclosing the angle $\beta$. This angle is meant to be constant and hence it can be used for a control process, while hitherto only the angle $\alpha$ was present in the signal, and this latter cannot be exploited for any control process because it suffers random variations according to the picture information. The new vector C was oriented to the color "green" in this example because this is one of the three primary colors of the picture and because it is located centrally in the spectrum between red and blue; however, this choice is not meant as a rigid standard. In this example "green" is the pilot color and therefore the corresponding position of the new vector C was marked at "green" in the color circle of the diagram. While the reference vector B is stored dynamically, the auxiliary vector C is stored either by the phosphorescence of the screen and by the inertia of the human eye, or by charging some capacitance in proportion to the phase angle, this making possible the observation and the regulation of the angle $\beta$ despite the fact that the two vectors which enclose this angle are transmitted sequentially and at different times. On the screen the auxiliary vector C is displayed as a color sample (pilot color).

Figure 2:
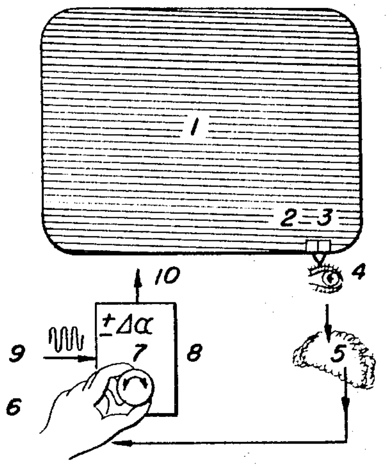

FIG. 2 shows a screen 1, and on this screen at the spot 2 said color sample; it is normally masked, e.g. by some kind of lid or slider. However, during the tuner process the eye 4 of the operator is watching the color sample 2. Side by side to said color sample sample is to be found the reference color 3; it is preferably produced on the screen, too, as shall be explained later. Now the brains 5 commands the hand 6 of the operator in such a way through the knob 7 of the phase shifting circuit 8 this latter produces a phase shift of $\pm\Delta a$, thus matching perfectly the pilot color 2 and the reference color 3. This is a control process, carried out visually and manually, as it can be recommended for inexpensive equipment. The phase shifting circuit 8 is conventional, i.e. it is fed at its input terminal 9 with the burst (or with the corresponding continuous oscillation); its output 10 feeds the color decoding circuit. However, while hitherto the operator had no exact criterium for moving the knob 7 and had to rely on the casualities of the picture contents and on his own color memory with its usually poor accuracy, now he can match the two colors at the spots 2 and 3 of the screen with a nearly colorimetric accuracy.

Figure 3:
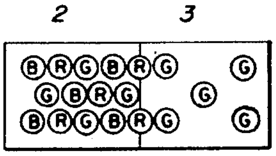
Figure 4:
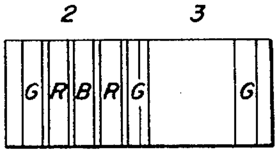

The reference color at 3 might, as an emergency solution, be located or generated outside the picture tube, this making very difficult, however, correct matching to the pilot color 2, especially because the luminance of the pilot color 2 depends on the beam current. Hence, according to FIG. 3, the reference color 3 is generated inside the picture tube, too; this drawing shows on a larger scale the same zones of the screen 1, which in FIG. 2 were marked with the numbers 2 and 3. Therefore in FIG. 3 the pilot color appears at 2 (left side), while the reference color has to appear at 3 (right side). For this purpose, this latter zone is manufactured only with green phosphor dots (G), while all other parts of the screen, as shown in the zone 2, are coated conventionally in three colors. Hence the pilot color may appear as a mixture of the three basic colors, while the reference color has no other choice than green, due to the absence of the other two phosphors in zone 3. The correct phase setting is easily visible because in this case the left and the right zones of FIG. 3 show exactly the same green; with a phase error, a color mixture appears in the left zone, while the right zone continues with the same green, its intensity, however, becoming weaker with small phase errors, or vanishing completely with big errors. Thus the operator also might find the correct phase setting only by tuning the right zone for its maximal green luminance. FIG. 3 is meant for spot phosphor coating with the three primary colors R, G and B, as it is used in the conventional shadow mask tube. FIG. 4, however, shows the same principle applied to a striped screen with the phosphor sequence RGRB. In an analog way this idea may be used for other kinds of color screens, too.

Figure 5:
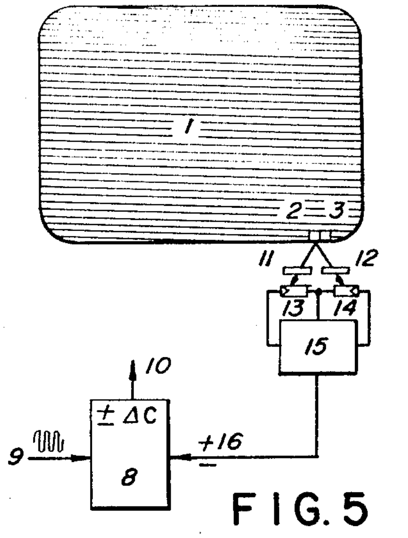

FIG. 5 is similar to FIG. 2, with the difference that the human organism is replaced by an automatic control circuit. Here the light of the color sample appearing at spot 2 (pilot color) is conduced through some kind of optics (not shown in the drawing), which eventually may comprise fiber glass conducts, to the photo-resistances or photocells 13 and 14. However, the light beams have to cross the color filters 11 and 12, whose color lies spectrally above and below the pilot color. Thus, if e.g. green is the pilot color, then filter 11 should be blue and filter 12 red. If the screen is producing the right pilot color, neither the photo-sensor 13 nor the photo-sensor 14 will receive light, or both are receiving only some weak residual light, as passed through the filters 11 and 12. The discriminator circuit 15 is lad out in such way, that in this case there is no control voltage at its output terminal 16. However, if the pilot color should be shifted, e.g. towards yellow, the illumination of the photo-sensor 14 is increased and that of the photo-sensor 13 decreases, thus causing an unbalance of the discriminator 15. This produces a positive or negative control voltage at its output terminal 16, which is fed to the phase shifting circuit 8, this being a voltage sensitive version. This circuit then tries to return the subcarrier phase and the hue of the pilot color, as seen on the screen at spot 2, to its correct value. As the screen light has pulse character, the photo-resistances (or photocells) 13 and 14 are delivering only pulses to the discriminator 15; therefore in its interior circuit, not shown in this drawing, care must be taken to get an output voltage of D.C.-character, either by an integrating circuit or by proper rectification.

According to FIG. 2 and FIG. 5 the transmitted color samples are located at the end of the picture (i.e., in the last lines of each field). However, they may be located, as an alternative, at the end of each line, then appearing at the right picture edge, where the light take-off point should be installed in this case. In FIG. 5 the unvariable reference color appearing at spot 3 is used only occasionally for visual inspections, for instance when putting to work the receiver for the first time, or for alignment purposes.

Figure 6:
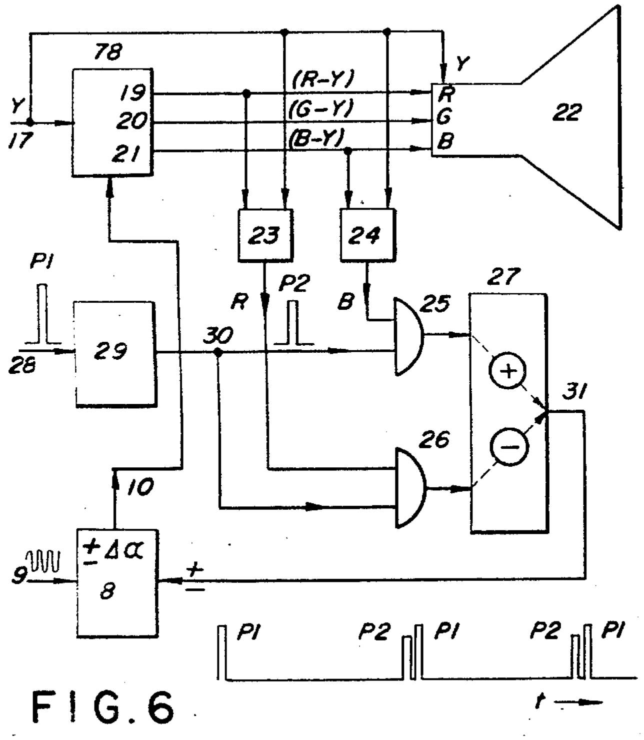

In FIG. 6 the same principle was realized with electronic circuitry only. In this example, too, it was supposed to work with "green" as the pilot color. The drawing shows the three gun picture tube 22 (top), which is fed from the decoder 18 through its output terminals 19, 20 and 21 with the difference-signals (R–Y), (G–Y) and (B–Y) and through the input terminal 7 with the luminance signal Y; thus are formed, by matrix action within the picture tube, the signals R, G and B, corresponding to the three primary colors. The decoder 18 is fed from the input terminal 9 through the oscillator or phase shifting circuit 8, respectively, from its output terminal 10 with the subcarrier-frequency. So far everything is conventional.

The discriminator 15 of FIG. 5 reappears in FIG. 6 under the number 27, with a different interior circuit, but with the same task of feeding, through its output terminal 31, the phase shifting circuit 8 with a control voltage, this being positive, zero or negative, depending on the shifting of the pilot color from its correct hue. This color shifting is sensed by the decoder 18: if the correct pilot color is green, then a color sample signal (returning to FIG. 1, this signal is vector C) has to appear exclusively at its output terminal 20, while the output terminals 19 for the R-signal and 21 for the B-signal must remain dead; hence no signal passes the matrix circuits 23 and 24 and the gates 25 and 26, and the discriminator 27 has no input and no output. However, if the "green" pilot color tends to shift, e.g., towards red, then the signal (R–Y) is fed from the decoder to the matrix 23, which converts it into an R-signal by addition of Y, this R-signal reaching gate 26 (this is an "AND" gate. as known from data processing circuitry, or a keyed linear amplifier). This gate is locked as long as the picture information is being transmitted, but it is opened for the pilot color signal.

For this purpose the pulse delaying circuit 29 is delivering, through its output terminal 30, the pulse P–2, and that shortly before the end of each line or of each field, this depending on the transmission standards. The circuit 29, through its input terminal 28, is triggered by the line (or field, respectively) synchronising pulse P–1. P–2 is delayed sufficiently to appear shortly before the next pulse P–1, as shown in the timing diagram on bottom of FIG. 6. Thus, if the wrongly "red" pilot color signal has passed through gate 26, it feeds the discriminator 27 and generates a control voltage at its output terminal 31, which is supposed to be negative in this example. This control voltage will correct the phase of the subcarrier frequency which is fed to the decoder 18, until the pilot color signal returns to the "green" output terminal 20 of the decoder, this leaving the matrix 23 and the gate 26 without signal. On the other hand, a signal reaches the positive side of the discriminator 27 through the matrix 24 and the gate 25 as soon as the "green" pilot color should shift towards blue, as this causes the signal (B–Y) to appear at the output terminal 21 of the decoder. Hence the decoder is taking over in FIG. 6 the same task as in FIG. 5 the two color filters 11 and 12; the matrix circuits 23 and 24 carry out the same signal addition which in FIG. 5 is done by the picture tube, connected according to the top part of FIG. 6; the pulse delaying circuit 29 and the gates 25 and 26 are separating the pilot color sample from the picture information, this being achieved in FIG. 5 by geometrical separation on the screen 1. Hence the circuit of FIG. 6 is an electronic analogy to the photo-electronical system of FIG. 5, with basically the same way of functioning.

Of course it would be possible to find more alternative versions at the receiving end, but all these versions would follow the common basic idea of this invention, to add a pilot color signal to the NTSC signal, which hitherto evidently was too short of information, and then to use this additional signal at the receiving end for manually monitoring the correct hue setting or for an automatic hue control.

I claim as my invention:

1. A color television system comprising means for transmitting standard color program signals including a pilot signal of known characteristics, a receiver responsive to said color program signals and said pilot signal and operative to produce an electrical signal representative of said pilot signal and having corresponding characteristics, and means for comparing said known characteristics with said corresponding characteristics and operative to adjust said receiver until the deviation therebetween is substantially zero.

2. A color television system according to claim 1, wherein said pilot signal represents a color having known characteristics, said receiver develops a color image in response thereto, and said comparison means compares the developed color image with a reference color having said known characteristics.

3. A color television system as defined in claim 2, wherein said receiver develops color images by selective presentation of a plurality of primary colors and said pilot signal represents one of said primary colors.

4. A color television system as defined in claim 2, utilizing a picture tube with selectively positioned color phosphors to develop said color images, said picture tube having phosphors of only one color coated in an area adjacent to the color developed in response to said pilot signal.

5. A color television system as defined in claim 2, wherein said receiver develops color images by line scanning a color picture tube and said pilot signal is transmitted shortly before the end of each line.

6. A color television system as defined in claim 2, wherein a receiver develops color images by line scanning a color picture tube and said pilot signal is transmitted in the last lines of each scanning field.

7. A color television system as defined in claim 2, in combination with automatic means for monitoring said developed color image and said reference color and providing an output signal having characteristics discretely representative of the amount of deviation between said colors, and means connected to said receiver and responsive to said output signal to adjust the receiver and reduce the amount of deviation to substantially zero.

8. A color television system comprising means for transmitting video signals containing phase variations representative of colors, means for transmitting as part of said singals a pilot signal representative of a predetermined color, receiver means effective to develop in response to said transmitted signals electrical signals which vary in phase substantially in accordance with the phase variations of said transmitted signals, means for converting said electrical signals to color images, and comparison means for comparing the color developed in response to said pilot signal with said predetermined color.

9. A color television system as defined in claim 8, including means for developing said predetermined color at the receiver independent of the variations of said transmitted signal.

10. A color television system as defined in claim 8, wherein said comparison means operates in response to the hues of the compared colors to develop an output discretely representative of the deviation in hue therebetween, and including means responsive to said output to modify the phase of said electrical signal until there is no deviation in hue.

11. A color television system as defined in claim 8, wherein said receiver means functions to completely scan a color picture tube, and said pilot signal is transmitted substantially at the end of each scanned line.

12. A color television system as defined in claim 8, wherein said receiver means functions to completely scan a color picture tube, and said pilot signal is transmitted in the last lines of each scanning field.

13. A color television system as defined in claim 8, wherein said comparison means comprises means for filtering the light emanating from the color image developed in response to said pilot signal and developing an electrical signal having a magnitude and polarity respectively commensurate with the degree and direction of deviation in hue exhibited by the developed color image with respect to said predetermined color.

14. A color television system as defined in claim 8, wherein said comparison means comprises means for deriving two light beams from the color image developed in response to said pilot signal, individual filter means interposed in the paths of each of said beams and adapted to pass light spectrally above and below the wavelength of said predetermined color, and photosensitive means responsive to the filtered light to produce an output having a magnitude and polarity determined by the amount of light passed by each of said filters, said output being used to control means for modifying the phase of said electrical signal until the output from said photosensitive means is substantially zero.

15. A color television system as defined in claim 14, wherein said photosensitive means includes two photoelectric cells connected to a discriminator circuit, said discriminator circuit producing an output commensurate in magnitude with the difference between the outputs delivered from said photoelectric cells.

16. A color television system comprising means for transmitting signals containing phase variations discretely representative of colors and receiving means responsive to said signals for producing electrical signals having substantially the same phase variations, said transmitted signals including a pilot signal of known phase, comparison means for comparing the phase of said electrical signals with said known phase during receipt of said pilot signal and producing an output having a characteristic that varies commensurately with the amount of phase deviation, and means coupled to said receiving means and controlled by said comparison means to modify the phase of said electrical signals until said phase deviation is substantially zero.

17. A color television system according to claim 16, wherein the phase of said pilot signal represents a particular primary color, including means responsive to said electrical signals to produce a plurality of independent signals representing the primary color components of the color represented by the phase of said electrical signals at any given time, said comparison means being selectively operative during receipt of said pilot signal to produce an output having a characteristic that discretely represents the presence and relative magnitude of any independent signals other than that representing said particular primary color.

18. A color television system according to claim 17, wherein said transmitted signals periodically provide color information for a complete picture, said pilot signal occurs near the end of each period, and the beginning of each period includes a synchronizing signal, said comparison means comprising delay means operative in response to said synchronizing signal to produce a gating signal coincident in time with occurrence of said pilot signal, gating means supplied by all of said independent signals except the one representing said particular primary color, said gating means being controlled by said gating signal to provide outputs having magnitude commensurate with the magnitude of each said independent signal, and a discriminator supplied by said outputs operative to produce a voltage having a polarity and magnitude determined by the respective magnitude of the gated outputs.

19. In a color television system, the process of synchronizing the hue of a picture developed upon a picture tube with the hue of the image represented by received television signals, comprising transmission of a pilot signal representing a color having known characteristics along with each transmitted frame of said picture, developing at a predetermined position on the picture tube a color representation in response to said pilot signal, comparing the characteristics of said color representation with said predetermined color, and adjusting the receiver to modify the color representation until there is no deviation in hue from said predetermined color.

References Cited

UNITED STATES PATENTS

| | | | |
|---|---|---|---|
| 2,844,646 | 7/1958 | Wlasuk | 178—5.4 |
| 2,854,505 | 9/1958 | Davis | 178—5.4 |
| 2,858,368 | 10/1958 | Kennedy | 178—5.4 |
| 2,931,856 | 4/1960 | Davis et al. | 178—5.4 |

RICHARD MURRAY, Primary Examiner

U.S. Cl. X.R.

178—5.4, 6